United States Patent Office 3,551,168
Patented Dec. 29, 1970

3,551,168
PROTECTIVE POLISH
James G. Atherton, Roselle, and Warren A. Wagner, Westmont, Ill., assignors, by mesne assignments, to Armour Industrial Chemical Company, a corporation of Delaware
No Drawing. Continuation-in-part of application Ser. No. 447,981, Apr. 14, 1965. This application Aug. 1, 1966, Ser. No. 569,035
Int. Cl. C09g 1/04, 1/18
U.S. Cl. 106—8          4 Claims

ABSTRACT OF THE DISCLOSURE

A protective polish composition for auto laundries of a dicoco dimethyl quaternary, an ethoxylated tertiary amine and an emulsifiable mineral oil.

---

This application is a continuation-in-part application, of Ser. No. 447,981 filed Apr. 14, 1965, now abandoned.

This invention relates to a protective polish composition especially useful in auto laundries, and more particularly to a polish composition which is substantive and therefore particularly useful in very dilute form in the wash or rinse liquids of auto laundries to effect a highly substantive, corrosion-resistant polish on the surface of the vehicle being washed.

Protective polish compositions are not generally new; see for example, Soap and Chemical Specialties, February, 1962, page 72 et seq. most of the presently used compositions have some undesirable properties or are difficult to mix or store. Some require relatively expensive ingredients, some are difficult to formulate, some require uneconomical amounts for proper polish effect, some are not sufficiently substantive, some are unstable, some possess salt which is corrosive, and some do not mix readily with the wash or rinse liquid.

An object of this invention is to provide a novel protective polish composition.

Another object is to provide a protective polish composition, of the above character, which is highly substantive.

Still another object is to provide a protective polish composition, of the above character, which can be substantially diluted in wash and/or rinse waters.

A further object is to provide a composition which imparts water shedding properties allowing rapid drying of washed articles.

A still further object is to provide a protective polish composition which provides corrosion protection.

Another object is to provide a protective polish composition which has freeze-thaw stability.

Other objects of the invention will in part be obvious and will in part appear hereinafter.

The invention accordingly comprises a composition of matter possessing the characteristics, properties, and the relation of components which will be exemplified in the composition hereinafter described.

In accordance with the objects enumerated above, the novel protective polish composition of this invention comprises at least one quaternary ammonium salt having two aliphatic hydrocarbon groups of from about 8 to 18 carbon atoms, at least one ethoxylated cationic emulsifier having an average of from 4.1 to 9.0 moles of ethylene oxide moieties therein, and an emulsifiable oil. More specifically, a 100% active protective polish concentrate according to this invention comprises about 25 to 62 weight percent of dicoco dimethyl quaternary ammonium salts such as halides and methyl sulfate; 7.5 to 17.5 weight percent of an ethoxylated (average degree of ethoxylation of 4.1 to 9.0 moles ethylene oxide per mole of amine) tertiary amine cationic emulsifier, and 38 to 75 weight percent of an emulsifiable mineral oil such as mineral seal oil. Waxes and/or silicone may be added.

Referring to the ethoxylated tertiary amine, it is preferred to utilize a compound containing one alkyl or alkylene group having from 12 to 18 carbon atoms, or mixtures thereof, such as is derived from tallow. Mixtures of compounds ethoxylated to various degrees may be utilized provided that the average degree of ethoxylation, on the basis of all the tertiary amine, is from about 4.1 to 9.0 moles. The preferred average degree of ethoxylation is from about 4.3 to 6.7 moles.

Emulsifiable mineral oils suitable for the formulations of this invention have a viscosity in the range of from about 20 to 200 SUS at 100° F. We prefer to use mineral seal oil having a viscosity of about 40 SUS at 100° F.

While the above proportions have been set forth illustrating a 100% active concentrate, a lesser active, such as 40%, concentrate may be formulated and satisfactorily stored. The diluent most advantageously utilized is water.

In formulating the polish composition, care must be taken to effect a ready-mix type solution. Car wash operation generally involves dilution of the polish composition by adding it to a tank of water prior to application, or by bleeding the concentrated composition into the wash or rinse water as it is fed to the spray nozzles of the automatic machinery. Such requires a formulation which dilutes easily. It has been found that the cationic emulsifier has a direct influence on such ease of dilution. If the average number of ethylene oxide moieties in the cationic emulsifier is greater than about 9, the formulation clouds (emulsion breakage), and if the average number is less than about 4.1, it gels.

The composition may be applied to the vehicle by diluting a 40% active concentrate 75 to 150 fold with water and spraying it onto the vehicle after it has been washed and rinsed or even while it is being washed or rinsed. The composition is so substantive that it may be used during or after rinsing. In fact, visual observation of the vehicle so treated will immediately reveal that the remaining water, after application, will quickly run off in droplets and a glossy finish appears. Such treatment greatly aids drying, either by air blast or by wiping.

It might also be noted that when the protective polish composition of this invention is compared to prior art compositions, a substantial improvement in water run-off occurs. Such occurs even with the use of substantially less composition than heretofore used, the explanation apparently being because of the use of the particular quaternary and emulsifier in the composition. Other quaternaries, such as the imidazoline and other longer chain fatty amine quaternaries do not provide similar results. Likewise, use of other alkoxylated amine emulsifiers in different proportions do not provide similar results. Either slow water run-off, poor polish effect, poor admixture with the wash or rinse water, corrosion, or instability occurs. Some of the data that follows illustrates such comparison.

For a fuller understanding of the nature and objects of this invention, reference should be had to the following detailed examples which illustrate specific compositions falling within the scope of this invention.

EXAMPLE I

The following ingredients are formulated into an emulsion using standard emulsion forming techniques:

| | Percent |
|---|---|
| Arquad 2C–75 | 15.76 |
| Ethomeen T/15 | 2.42 |
| Ethomeen T/25 | 1.21 |
| Mineral seal oil | 20.60 |
| Water | 60.01 |

Color can be added if desired.

The above formulation is continuously added (about 2 ounces per gallon of water) to the rinse water of an existing quick wash auto laundry. The laundering technique employed involves washing of the auto body, rinsing with fresh water, followed by a second rinse, in which the above formulation has been added. Then, for test purposes, a third rinse of fresh water, without additives, is sprayed on the auto body, blown dry, and the result visually observed and compared against polish compositions presently used. The rinse water runs off faster than with other prior art polish compositions, and a glossier finish appears on the auto body surface. This formulation has good freeze-thaw stability.

EXAMPLES II AND III

Formulations using Arquad 2HT–75 and Arquad 2C–75 are made having the following compositions (parts by weight):

| | II | III |
|---|---|---|
| Arquad 2HT–75 | 55.00 | |
| Arquad 2C–75 | | 13.00 |
| Ethomeen T–25 | 10.00 | |
| Ethomeen T–15 | | 5.00 |
| Carbowax 400 | | 5.00 |
| Neo-Fat 18–53 | 14.00 | |
| NaHCO₃ | | 3.00 |
| Mineral oil | 60.00 | 15.00 |
| Water | 361.00 | 59.00 |

When the above formulations are tested in an automatic car laundry and compared to the results of existing polish compositions, the following results are observed:

Example II.—Does not work.

Example III.—Good water run-off, excellent polish effect.

Existing formulation based on imidazoline type cationic compound.—Fair water run-off, good polish effect.

EXAMPLES IV AND V

Additional protective polish compositions are made using the following ingredients:

| | IV | V |
|---|---|---|
| Arquad 2HT–75 | 11.6 | |
| Arquad 2C–75 | | 5.00 |
| Duoquad T/50 | 3.5 | |
| Ethomeen T/15 | 2.8 | 1.00 |
| Neo-Fat 18–53 | 1.1 | |
| Mineral seal oil | 21.0 | 4.00 |
| Silicone SF–96–100 | 0.10 | |
| Carnauba wax | 4.00 | |
| Water | 60.00 | 89.80 |

Testing of the above formulations against existing polish compositions reveals the following:

Example IV.—Fails.

Example V.—Good admixture with rinse water, good water run-off, drying, and good polish effect.

Existing formulation based on imidazoline type cationic compound.—Good admixture with rinse water, fair water run-off, fair polish.

EXAMPLES VI AND VII

Blends of dicoco and di-tallow quaternary are tried as follows:

| | VI | VII |
|---|---|---|
| Arquad 2C–75 | 26.0 | 5.2 |
| Arquad 2HT–75 | 22.0 | 39.6 |
| Ethomeen T/25 | 14.0 | 9.2 |
| Neo-Fat 18–53 | 1.5 | 2.8 |
| Mineral oil | 56.0 | 52.0 |
| Water | 280.5 | 291.2 |

The above blends behave as if the Arquad 2C–75 is diluted. It would appear from this and the prior results of inoperability of Arquad 2HT–75, that the use of compounds such as Arquad 2C–75 is preferred.

Additional formulations are compounded using the same technique of Example I as follows:

EXAMPLE XIII

| | |
|---|---|
| Arquad 2C–75 | 3.15 |
| Ethomeen T/15 | 0.48 |
| Ethomeen T/25 | 0.24 |
| Mineral seal oil | 4.12 |
| Water | 93.01 |

EXAMPLE IX

| | |
|---|---|
| Arquad 2C–75 | 13.00 |
| Ethomeen T/15 | 2.00 |
| Ethomeen T/25 | 1.00 |
| Mineral seal oil | 17.00 |
| Water | 67.00 |

EXAMPLE X

| | |
|---|---|
| Arquad 2C–75 | 19.70 |
| Ethomeen T/15 | 3.03 |
| Ethomeen T/25 | 1.52 |
| Mineral seal oil | 25.96 |
| Water | 49.75 |

EXAMPLE XI

| | |
|---|---|
| Arquad 2C–75 | 23.63 |
| Ethomeen T/15 | 3.64 |
| Ethomeen T/25 | 1.82 |
| Mineral seal oil | 30.91 |
| Water | 40.00 |

The above formulations have good freeze-thaw stability. They perform excellently when used in a car wash rinse cycle.

EXAMPLE XII

To verify the corrosion protection imparted by the composition of this invention, mild steel coupons are treated with regular car rinse solution containing the above composition in the concentrations shown. The coupons are then exposed for ten days at 110° F. and 100% humidity. The observations, after that time, will be as follows:

TABLE 1

| Observation: | Percent active |
|---|---|
| Heavy rusting | 0 |
| Very light rusting | 8 |
| Very light rusting | 40 |

It is evident that corrosion resistance has been imparted to the steel coupons coated with the composition of this example.

In the above examples, the trademarks used refer to the following compounds:

Arquad 2C–75.—Dicoco dimethyl quaternary ammonium chloride 75% active sold by Armour and Company, Chicago, Illinois.

Arquad 2HT–75.—Dihydrogenated tallow, dimethyl quaternary ammonium chloride 75% active sold by Armour and Company, Chicago, Ill.

Duoquad T/50.—N tallow N N dimethyl, N'N'N'trimethyl propylene diquaternary ammonium chloride 50% active, sold by Armour and Company, Chicago, Ill.

Ethomeen T/15.—Tallow bis ethoxylated amine (ethoxylated with average 5 moles of ethylene oxide) sold by Armour and Company, Chicago, Ill.

Ethomeen T/25.—Tallow bis ethoxylated amine (ethoxylated with 15 moles of ethylene oxide) sold by Armour and Company, Chicago, Ill.

Neo-Fat 18–53.—Stearic acid, sold by Armour and Company, Chicago, Ill.

Silicone SF–96–100.—Methyl silicone (100 cps. viscosity) sold by General Electric Co., Waterford, N.Y.

Carbowax 400.—Polyoxyethylene of M.W. 400 sold by Union Carbide, N.Y.

It is seen from the above examples that a particularly preferred composition suitable for incorporation into rinse waters during laundering of vehicles comprises from about 30 to 40 weight percent dicoco dimethyl quaternary ammonium chloride, about 8.5 to 15 weight percent ethoxylated tertiary amine having an alkyl or alkylene group of from 12 to 18 carbon atoms and an average degree of ethoxylation of from 4.3 to 6.7 moles, and from about 45 to 60 weight percent mineral seal oil.

The above indicated satisfactory formulations have good shelf life, inhibit corrosion and act as protective polishes when applied to automobile bodies. The diluted form in which the formulations may be used make them extremely economical. When applied to the automobile in the rinse water, the concentration of active composition is from about 0.075 to 0.5%. Indeed, at this rate, a 10 gallon drum of a 40% active formulation will impart a uniform luster to about 1000 to 3000 automobiles. The low viscosity and compatibility makes dilution quite easy and, if desired, a proportioning pump can be used for such purpose.

It will thus be seen that the objects set forth above, among those made apparent from the preceding description are efficiently attained and, since certain changes may be made in the above composition of matter without departing from the scope of the invention, it is intended that all matter contained in the above description shall be interpreted as illustrative and not in a limiting sense.

It is to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

We claim:

1. A protective polish composition suitable for incorporation into rinse waters during laundering of vehicles comprising from about 25 to 62 weight percent of dicoco dimethyl quaternary ammonium salt as the substantive component of the composition; from about 7.5 to 17.5 weight percent of at least one bis-ethoxylated tertiary amine having an alkyl or alkylene group of from 12 to 18 carbon atoms and the total of said tertiary amine having an average degree of ethoxylation of from 4.1 to 9.0 moles as the emulsifying component of the composition; and from about 38 to 75 weight percent of an emulsifiable mineral oil.

2. The composition of claim 1 wherein said average degree of ethoxylation is from 4.3 to 6.7 moles.

3. The composition of claim 1 wherein said oil is mineral seal oil.

4. A protective polish composition suitable for incorporation into rinse waters during laundering of vehicles comprising from about 30 to 40 weight percent dicoco dimethyl quaternary ammonium chloride as the substantive component of the composition; from about 8.5 to 15 weight percent bis-ethoxylated tertiary amine having an alkyl or alkylene group from 12 to 18 carbon atoms and an average degree of ethoxylation of from 4.3 to 6.7 moles as the emulsifying component of the composition; and from about 45 to 60 weight percent mineral seal oil.

References Cited

UNITED STATES PATENTS

| | | | |
|---|---|---|---|
| 2,584,413 | 2/1952 | Baer | 106—11 |
| 2,745,809 | 5/1956 | Cardwell et al. | 252—392X |
| 3,088,796 | 5/1963 | Kahler et al. | 252—392X |
| 3,222,201 | 12/1965 | Boyle et al. | 106—3X |

JULIUS FROME, Primary Examiner

J. B. EVANS, Assistant Examiner

U.S. Cl. X.R.

106—285, 11, 243; 117—134, 167; 252—153, 312, 392